(12) United States Patent
Choi et al.

(10) Patent No.: US 6,256,194 B1
(45) Date of Patent: Jul. 3, 2001

(54) PORTABLE COMPUTER WITH LATCH ASSEMBLY

(75) Inventors: Young-Jun Choi; Du-Il Kim, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/453,559

(22) Filed: Dec. 3, 1999

(30) Foreign Application Priority Data

Dec. 3, 1998 (KR) .................................................. 98 52928

(51) Int. Cl.[7] ........................................................ G06F 1/16
(52) U.S. Cl. .......................... 361/683; 361/679; 361/680; 361/681; 361/682; 361/686; 292/4; 292/57; 70/158; 70/159
(58) Field of Search ..................................... 761/679–681, 761/683, 686; 292/4, 57; 70/158, 159

(56) References Cited

U.S. PATENT DOCUMENTS

| | | | |
|---|---|---|---|
| 3,709,538 | 1/1973 | Seitz et al. | 292/128 |
| 4,527,821 | 7/1985 | Tanaka | 292/19 |
| 4,790,579 | 12/1988 | Maxwell et al. | 292/175 |
| 4,984,833 | * 1/1991 | Knurr | 292/96 |
| 6,108,196 | * 8/2000 | Jung | 361/683 |
| 6,115,239 | * 9/2000 | Kim | 361/681 |

* cited by examiner

*Primary Examiner*—Leo P. Picard
*Assistant Examiner*—Yean-Hsi Chang
(74) *Attorney, Agent, or Firm*—Robert E. Bushnell, Esq.

(57) ABSTRACT

A latch assembly including a lug, a rack, and a lever is provided for portable computer. The lug rotatably mounted on a cover case. A hook formed on the other end of lug protrudes through a hook opening of cover case in a closed position so as to be securely connected to hook holder of a main body case through a front opening of the main body case in a closed position and is securely located into inside of the cover case in the open position so as to avoid being broken and injuring an user. The rack slidably disposed within the cover case allows the lug to be projected through the cover case or to be located underneath the cover case. The lever disposed at an outer surface of the cover case is connected to the rack to causes the rack to slidably and linearly move and the lug to rotate and to protrude from and retract into the surface of the cover case. Protrusions formed on the lever contacts a pair of convex portion of the cover case so as to securely maintain the closed or open position.

20 Claims, 6 Drawing Sheets

PORTABLE COMPUTER WITH LATCH ASSEMBLY

CLAIM OF PRIORITY

This application makes reference to, incorporates the same herein, and claims all benefits accruing under 35 U.S.C. §119 from my application PORTABLE COMPUTER WITH LATCH ASSEMBLY filed with the Korean Industrial Property Office on Dec. 3, 1998 and there duly assigned Ser. No. 52928/1998.

BACKGROUND OF THE INVENTION

1. Field of the Invention

The present invention relates to a latching device for a portable computer, and more particularly to a latch assembly suitable for a portable personal computer having a thin-layer cover.

2. Related Art

Latch devices have been used in portable computers including a cover case and a main body case. Typically, the cover case of the computer is connected to the main body case through a hinge which allows the cover case to rotate about an axis within the hinge to a closed position and an open position. A user opens the cover case upward from the main body case in the open position and then uses a key board and touch pad of the portable computer while viewing a screen of a display unit. When the cover case and the main body case are in the closed position, the latch device locks the cover case and the main body case so as to cover the main body case with the cover case, to protect the keyboard of the main body case and the display unit of the cover case, and to maintain the portable computer in the closed position. When the latch is manually released, the cover can be opened. The more compact in size and relatively light in weight the portable computer has continuously evolved, the more compact and precise the latch device suitable for a thin-layer cover case and a thin-layer main body case is needed to be.

Efforts to lock the cover and the main body have spawned various types of latches. For example, U.S. Pat. No. 3,709,538 for a Latch for Receptacle issued to Seitz at al., U.S. Pat. No. 4,527,821 for a Sliding Spring Latch issued to Tanaka, and U.S. Pat. No. 4,790,579 for a Sliding Spring Latch issued to Maxwell at al. show a latch device attached to a door or cover, while U.S. Pat. No. 5,011,198 for a Handle Latch Assembly issued to Gruenberg et al. and U.S. Pat. No. 5,497,296 for an Electronic Apparatus With Hinged Display And Latch Mechanism For Releasably Latching Displays In Closed Position issued to Satou et. al. propose a latch assembly for a portable or laptop personal computer. We have found that the embodiments described by these references do not indicate that a latch claw protruding from a cover surface in a closed position can be retracted to the inside of the cover surface while in an open position.

U.S. Pat. No. 4,984,833 for a Lock Hook issued to Knurr discloses a lock hook for a door of a computer cabinet. Although the lock hook pivots about a pivot axis and projects out of a main surface in a closed position and pivots complete into an opening in the main surface of the door in a open position, the lock hook assembly, however, rotates by a complicated combination of a push rod having an sectionally circular driver, an opening area accommodating the sectionally circular driver and a substantially positive rounded portion of the lock plate contacting the sectionally circular driver. We have noticed that this reference includes a complicated latch structure which does not fit a compact and small laptop or portable computer with a small thickness.

SUMMARY OF THE INVENTION

It is an object of the present invention to provide an improved latch apparatus able to position a cover case and a main body case of a portable computer to a closed position and an open position.

It is another object to provide a latch apparatus able to protect a lug rotatably mounted on a cover case in the open position of the portable computer.

It an yet another object to provide a latch apparatus able to securely maintain the lug located underneath of the surface of the cover case.

It is still another object to provide a latch apparatus able to protect an user from being damaged by a look hook protruded from a surface of the cover case.

It is a further object to provide a latch apparatus able to be installed in a compact portable computer having a cover case with a small thickness.

It is also an object to provide a latch apparatus capable of securely maintain the closed position of the portable computer.

It is also an object to provide a latch apparatus for automatically enforcing the cover case to be opened.

These and other objects may be achieved by providing a portable computer with a latch assembly including a lug rotatably mounted within a receptacle of a cover case, a rack slidably disposed within the receptacle of the cover case and allowing the lug to be projected through the cover case or to be located underneath the cover case, a lever disposed at an outer surface of the cover case, connected to the rack, causing the rack to slidably and linearly rotate the lug, and allowing the lug to protrude from and retract into the surface of the cover case, and protrusions formed on the lever, contacting a pair of convex portion of the cover case, securely maintaining a locking state in the closed position and a non-locking state of the open position.

A pinion gear formed on one end of the lug contacts a rack gear formed on the rack. A hook formed on the other end of lug protrudes through a hook opening of cover case in closed position so as to be securely connected to hook holder of a main body case through a front opening of the main body case in a closed position and is securely located into the inside or underneath of the cover case in the open position so as to avoid being broken and injuring an user.

The latching assembly further includes a first spring connected to an inner surface of the receptacle of the cover case and one end of the rack to securely maintain the closed position by holding the hook of the lug in a latch position when the cover case is positioned in the closed position, a locker disposed within the cover case and coupled to the other end of the rack to securely maintain the lug to be located underneath of the cover case when the cover case is positioned in the open position, and a second spring located to contact the locker and allow a protrusion of the locker to protrude from the surface of the cover case through a locker opening formed on the cover case so as to push out the front plate of the main body case when the cover moves from the closed position to the open position by the second spring.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
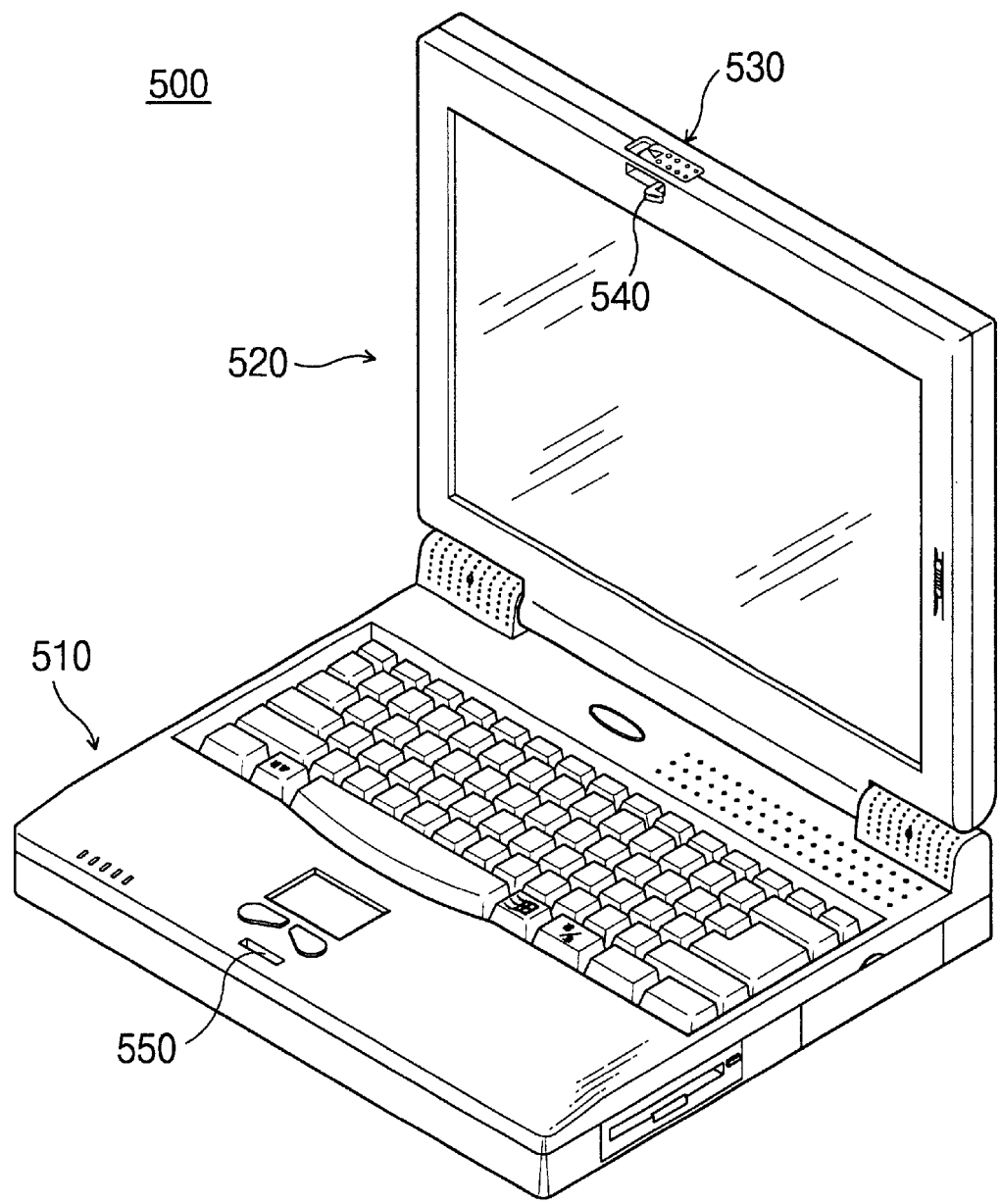
FIG. 1 is a perspective view for illustrating a portable computer with a locking apparatus.
Figure 2:
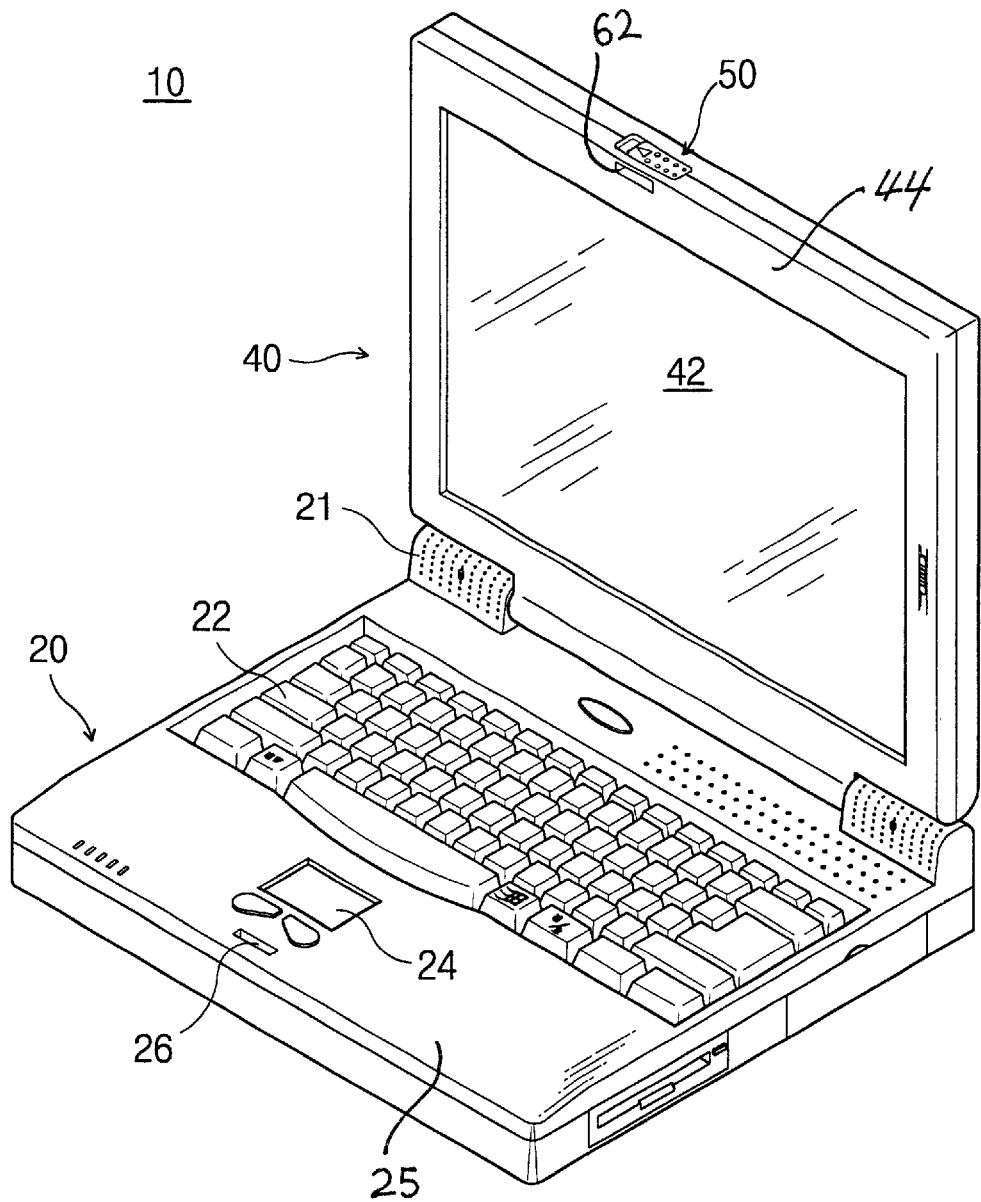
FIG. 2 is a perspective view for illustrating a portable computer with a locking apparatus according to a first embodiment of the present invention.
Figure 3:
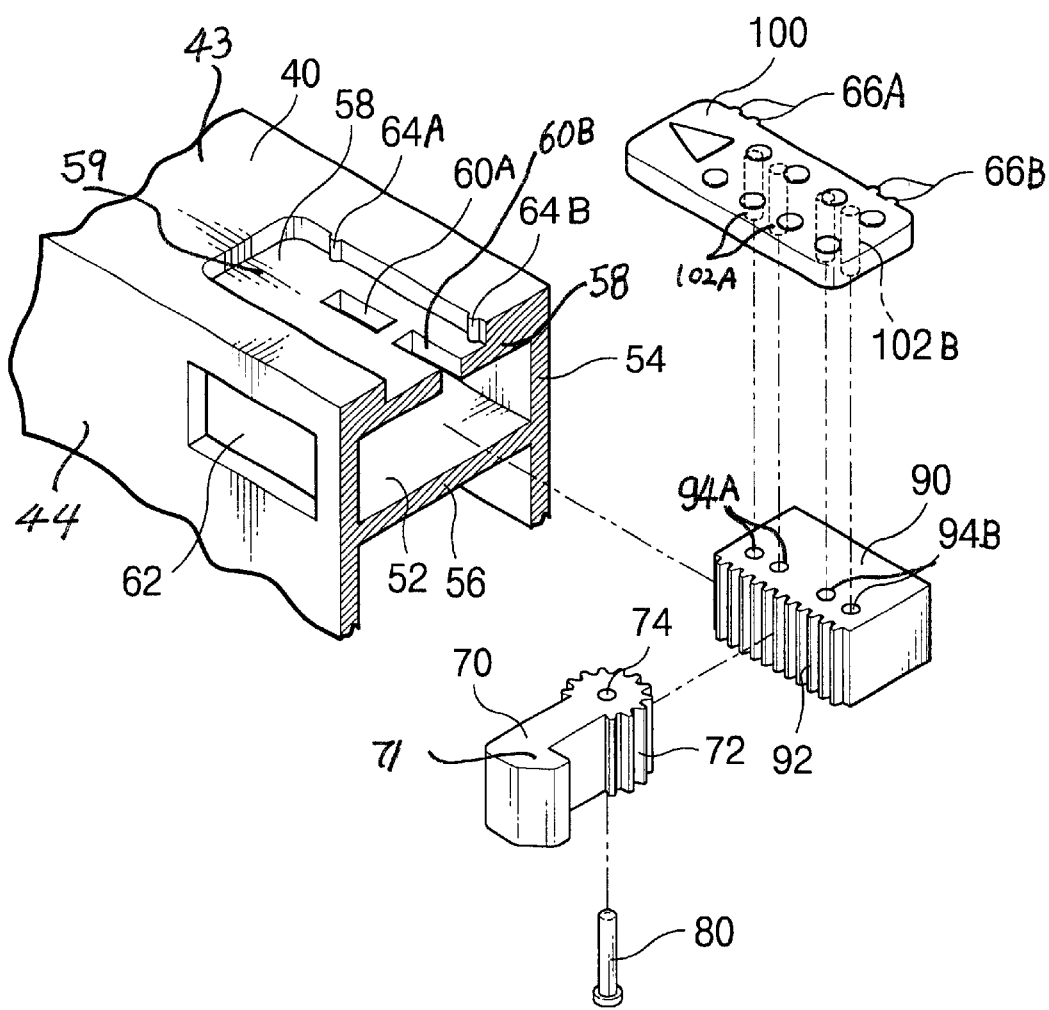
FIG. 3 is an exploded perspective view for illustrating the locking apparatus shown in FIG. 2.

Referring to FIG. 1, a portable computer 500 includes a main body case 510 and a cover case 520 connected to main body case 520 in a closed position or an open position by means of a latch assembly 530 mounted on cover case 520 and an opening 550 formed on the main body case 510. Cover case 520 is connected to main body case 510 through a hinge which allows cover case 520 to rotate about an axis of the hinge to a closed position and an open position and to be opened upward from main body case 510 and a user to use a keyboard of main body case 510 and a display unit of cover case 520. Latch assembly 530 is usually located on a top side of cover case 520. When cover case 520 is locked by latch assembly 530 in the closed position, cover case 520 is fixed at main body case 510 of portable computer 500. A lug mounted on latch assembly 530 extends outwardly to be coupled to opening 550 of main body case 510. Since the lug 540 protrudes in the open position, user can be injured by the lug 540, and the lug 540 can be broken or damaged.

The main body case contains all of the essential circuitry of the computer such as the CPU, the power supply, data storage devices, and a keyboard attached to a front side of the main body case while the cover case holding a display unit covers keyboard. The display unit can be a video monitor, a liquid crystal display, or any other equivalent devices. The computer is often turned on when the cover case rotates upward. The cover case can protect both the display unit and keys of the main body case by covering the main body case for transportation.

Referring to FIGS. 2 through 5, a portable personal computer 10 includes a main body 20 containing the internal electronic circuitry. A keyboard unit 22 and a mouse pad 24 are attached to a front plate 25 of main body 20 and connected to the internal electronic circuitry. Keyboard unit 22 and mouse pad 24 allow an user to communicate with computer 10. A cover case 40 including a display screen 42 is coupled to main body 20 by a hinge 21. Display screen 42 is located on display plate 44. A display screen 42 and a keyboard unit 22 are exposed when cover case 40 rotates about an axis of hinge 21 to an open position.

A latch assembly 50 is attached to cover case 40 and is coupled to a hook holder 126 formed on front plate 25 of main body case 20 through a latch opening 62 formed on display plate 44 of cover case 40 and a front opening 26 formed on front opening 25 of main body case 20. A latch receptacle 52 is formed on inside of cover case 40 to accommodate a rack 90 and a lug 70 while a lever receptacle 59 is formed on outer surface of side plate 63 in cover case 40 to accommodate a lever 100 connected to rack 90 through connecting holes 60A and 60B. Rack 90 is inserted into latch receptacle 52 and slidably mounted on a bottom plate 56 of latch receptacle 52. While lever 100 is slidably mounted on a middle plate 58 of lever receptacle 59, extending pins 102A and 102B formed downwardly on lever 100 are inserted into holes 94A and 94B formed on rack 90 through connecting holes 60A and 60B so as to couple lever 100 to rack 90.

Two pairs of lever protrusions 66A and 66B as a first locking member formed on lever 100 contact a pair of convex portions as a second locking member formed on lever receptacle 59 of side plate 43 respectively while lever 100 slides in lever receptacle 59. Lever protrusions 66A and 66B may have a concave shape to accomodate one of convex portions 64A and 64B formed on lever receptacle 59 of side plate 43 respectively. When convex portions 64A and 64B arc located between the pair of lever protrusions 66A and 66B respectively, lever 100 held at a latching position causes latch assembly 350 to maintain cover case 40 and main body case 20 in the closed position or in the open position. One of lever protrusions 66A or 66B formed on lever 100 engages one of convex portions 64A or 64B formed on cover 40 to lock lug 70 to maintain in the lock state so as to hold lug 70 to project through latch opening 62 in the closed position or to be positioned within latch receptacle 52 without projecting through opening 62. One of convex portions 64A or 64B as the second locking member may be formed between lever protrusions 66A or 66B of lever 100. Once one of convex portions 64A or 64B is located between lever protrusions 66B, advertent releasing of cover 40 from the main body 20 is prevented by firmly locking lever protrusions and convex portions. Moreover, lug 70 positioned within latch receptacle 52 in the opening position is prevented from advertently projecting through latch opening 62 by firmly locking first and second locking members. In order to unlock first and second locking members, the user has to force lever 100 to slide. Before the user slide lever 100, the locking state of first and second locking members is firmly maintained.

Lug 70 includes a pinion gear which is coupled to a rack gear 92 formed on rack 90. A pin as a shaft is inserted into a hole formed on a center portion of pinion gear 72 and mounted on between a bottom plate 56 and middle plate 58. Lug 70 rotatable around pin 80 rotates about an axis of pin 80 while lever 100 and rack 90 move linearly and pinion gear 72 of lug 70 engages rack gear 92 of rack 90. A hook 71 formed on one end of lug 70 protrudes through and retracts from a latch opening 62 formed on display plate 44 of cover case 40 during the rotation of lug 70 and the linear movement of rack 90 and lever 100.

Figure 4:
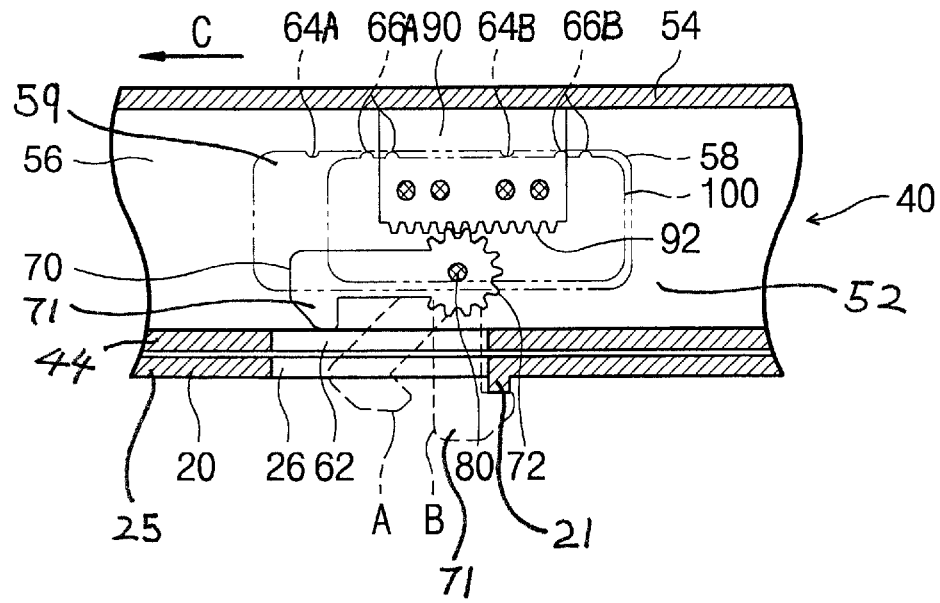
FIG. 4 is a cross-sectional view for illustrating a non-locking state of the locking apparatus according to the first embodiment.
Figure 5:
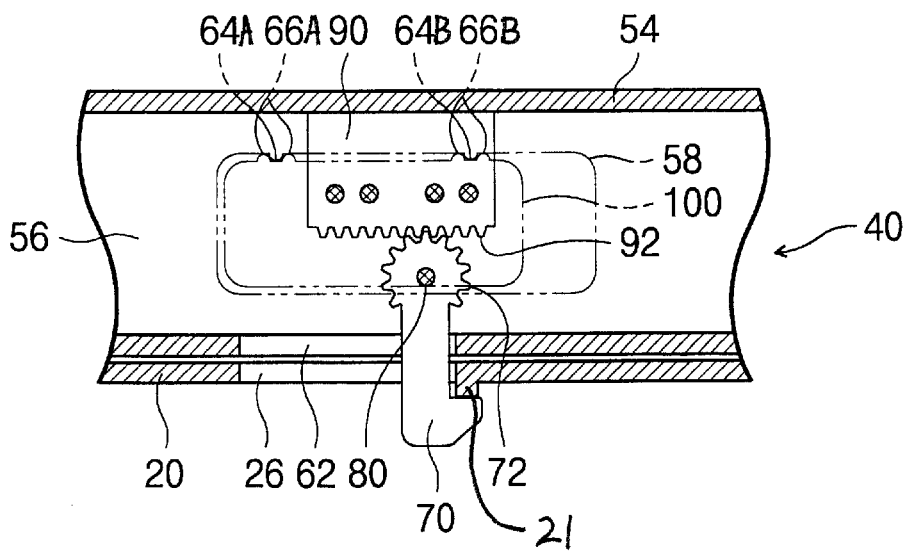
FIG. 5 is a cross-sectional view for illustrating a locking state of the locking apparatus according to the first embodiment.

FIGS. 4 and 5 show a non-latching state and a latching state of latch assembly 50 in the locking apparatus. When cover case 40 has moved to the closed position, the user slides lever 100 in the direction of an arrow C and moves to a latching position shown in FIG. 4. Lug 70 rotates around pin 80 depending on the movement of lever 100 and rack 90 and moves from the non-locking state to the lock state described in dotted lines A and B. Hook 71 of lug 70 protrudes and passes through latch opening 62 of cover case 40 and front opening 26 of main body case 20 and latches main body case 20 and cover case 40 by holding hook holder 21 formed on front plate 25 in main body case 20 as shown in a dotted line B of FIG. 4. The pair of convex portions 64A and 64B are located between the pairs of lever protrusions 66A and 66B respectively.

Lever protrusions 66A or 66B formed on lever 100 engages said one of convex portions 64A or 64B formed on cover 40 to lock lug 70 to maintain in the lock state so as to hold lug 70 to project through latch opening 62 in the closed position or to be positioned within latch receptacle 52 without projecting through latch opening 62. One of convex portion 64A or 64B as the second locking member may be formed between a set of lever protrusions 66A or 66B as the first locking member while the other one of convex portions 64A or 64B is formed between the other set of said protrusions 66A or 66B in FIG. 4. Once each convex portions 64A or 64B is located between lever protrusions 66B in the open position, the advertent projection of lug 70 through latch opening 62 is prevented by firmly locking first and second lock members. In order to unlock first and second lock members and project lug 70 through latch opening 62 for latching state, the user has to slide lever 100 to disengage first and second locking member. Before the user slide lever 100, the locking state of first and second lock members is firmly maintained.

One of convex portions 64A or 64B as first locking member formed on lever 100 engages lever protrusion 66A or 66B as second lock member formed on cover 40 to hold the lug 70 to maintain in the latching state so as to project the lug 70 through both latch openings 62 and front 26. Once the other one of convex portions 64A or 64B is located between lever protrusions 66B as shown in FIG. 5, lug 70 is prevented from unlatching by firmly locking first and second lock members. In order to unlock first and second lock members, the user has to slide lever 100 to disengage first and second locking member. Therefore, the movement of lever 100 and rack 90 is prevented, and lug 70 is maintained to securely hold hook holder 21 of main body case 20. Before the user slide lever 100, latch assembly 50 latches main body case 20 and cover case 40 in the closed position.

Figure 6:
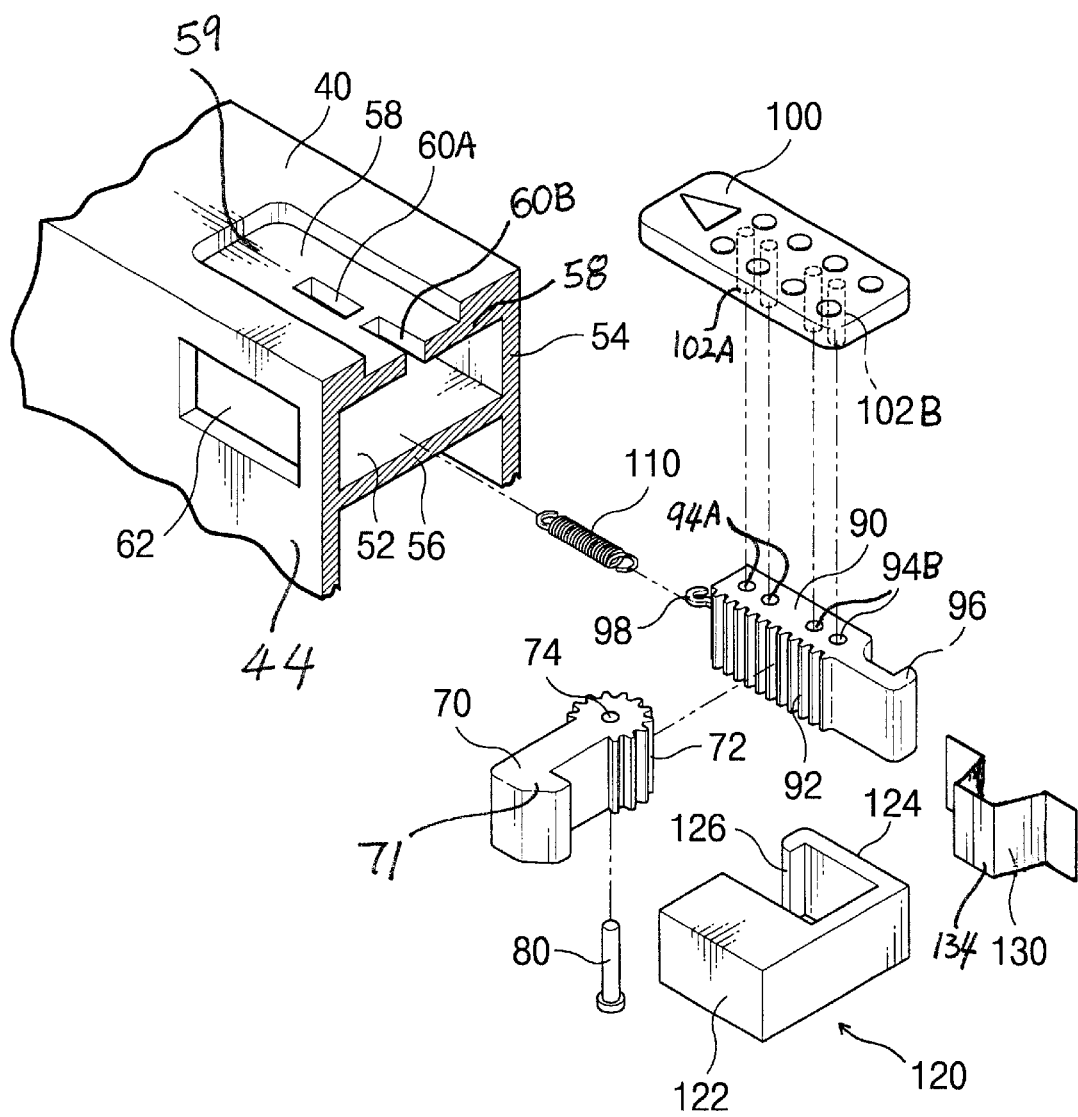
FIG. 6 is an exploded perspective view for illustrating the locking apparatus according to a second embodiment of the present invention.
Figure 7:
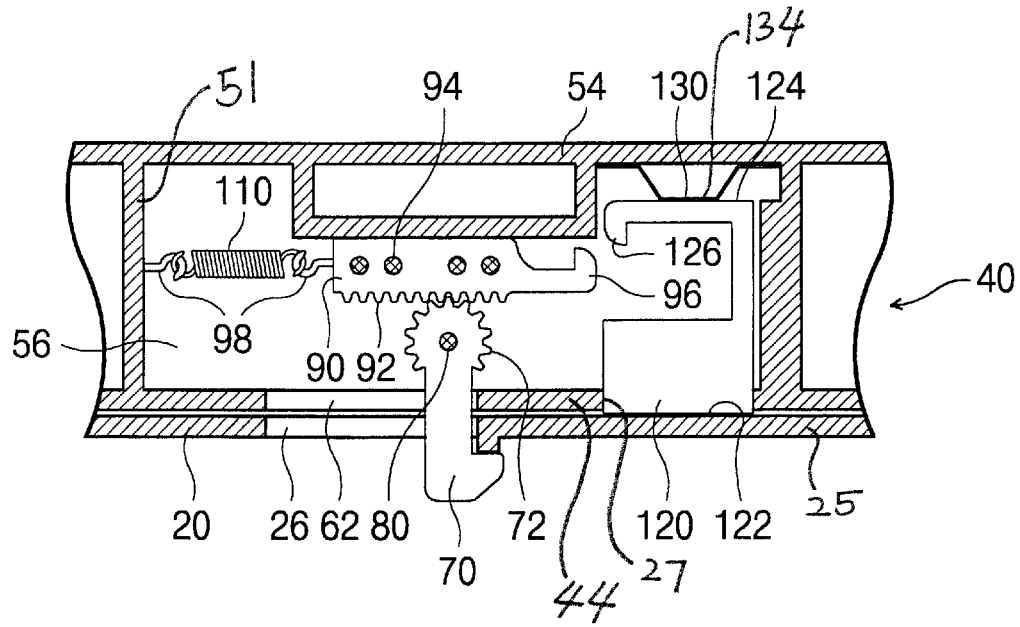
FIG. 7 is a cross-sectional view for illustrating a locking state of the locking apparatus according to the second embodiment.
Figure 8:
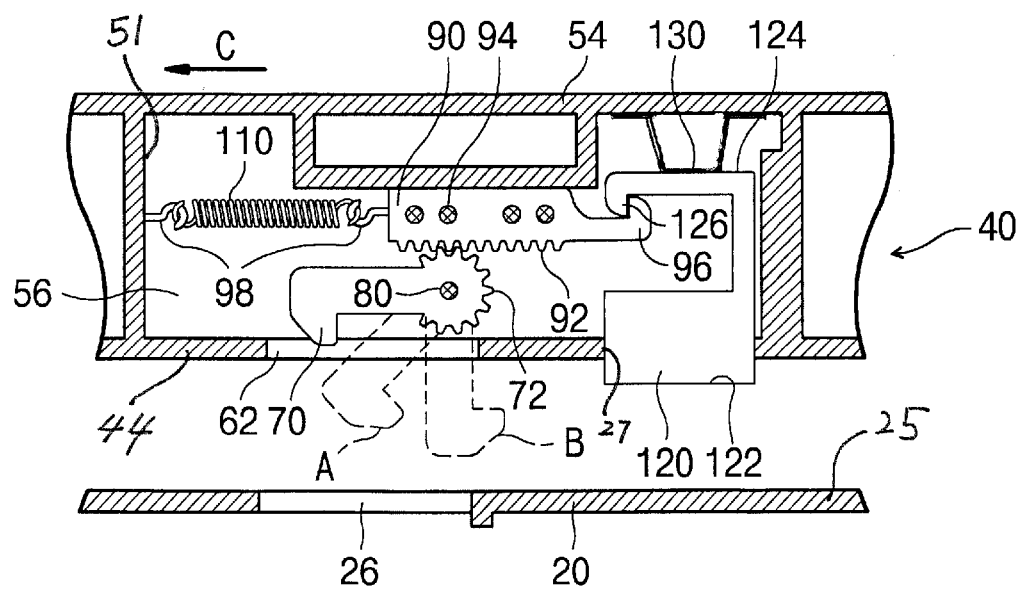
FIG. 8 is a cross-sectional view for illustrating a not-locking state of the locking apparatus in an open position of the display cover according to the second embodiment.

FIG. 6 shows a second embodiment of the locking apparatus according to the principle of the present invention. FIGS. 7 and 8 illustrate a locking state and a non-locking state of the locking apparatus of FIG. 6. One end of a first spring 110 formed with the coil type is connected to a link portion 98 formed on first end of rack 90, the other end of first spring 110 is connected a side wall 51 of latch receptacle 52. A second spring 130 formed with the plate type is disposed within latch receptacle 52 of cover case 40. One end of second spring 130 contacts a back plate of latch receptacle 52, the other end of second spring 130 contacts a surface 124 of a locker 120 to give an elastic force to locker 120 and to push locker 120 outside of cover case through locker opening 27 formed on display plate 44. A locker holder 126 formed on locker 120 is connected to a rack holder 96 formed on rack 90 in the closed position and disconnected from rack holder 96 in the open position.

When the cover case 40 and main body case 20 are in the closed position, front plate 25 pushes locker 120 into inside of cover case 40 through locker opening 27, and then locker holder 126 of locker 120 is disconnected from rack holder 96. The disconnection between locker holder 126 and rack holder 96 causes first spring 110 to pull rack 90 and lug 70 to maintain the latching position. When the user slides lever 100 to open cover case 40 from main body case 20, rack holder 96 becomes connected to locker holder 126. Extended portion 122 of locker 120 pushes front plate 25 to open cover case 40 from main body case 20 in response to the elastic force of second spring 130 during the connection between locker holder 126 and rack holder 96. Hook 71 of lug 70 is retracted from the latching position to the inside of cover case 40. The connection between locker holder 126 and rack holder 96 causes lug 70 to be located inside of cover case 40 in the open position.

When cover case 40 is located in the open position shown in FIG. 8, extended portion of locker 120 partially protrudes from display plate 44 of cover case 20 due to the elastic force of second spring 130. Locker holder 126 of locker 120 is coupled to rack holder 96. In this state, rack 90 is securely fixed to maintain the closed position by coupling rack 90 and locker 120. As cover case 20 is closed, locker 120 is pressed by front plate 25 of main body case 20, and locker holder 126 is released from rack holder 96. The connection causes rack 90 to move to the direction of the arrow C for the latching position B by the elastic force of first spring 110 and results to the rotation of lug 70 shown in FIG. 7 and a dotted line B of FIG. 8. Lug 70 rotates through hook opening 62 and front opening 26 as shown in FIG. 7 and a dotted line A of FIG. 8. Because of the elastic force of the first spring 110, the latching position of the lug 70 is securely maintained.

As described above, according to the principle of the present invention, a latch assembly including a lug rotatably mounted on a cover case securely maintains the lug not only to the latching state in the closed position but also to non-locking state for fully hiding lug in the inside of the cover case in the open position by using both a convex portion of the lever receptacle formed on the cover case and a protrusion formed on a lever connected to the lug through the rack. By using a pinion gear formed on one end of the lug and a rack gear formed on the rack and engaging the pinion gear of the lug, the latching state and non-lock state is securely maintained and become more accurate in closed and open positions. By using a first spring connected between the rack and the latch receptacle, a locker connected to and disconnected from the rack, the latch assembly securely maintains the latching state in the closed position and the non-lock state in the open position. The connection between the rack and the locker prevents the locker from protruding from the cover case and allows the locker to extend by a predetermined length. A second spring disposed between the locker and the latch receptacle causes the locker to push the front plate of the main body case during moving from the closed position to the open position and to help the user to open the cover case.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A latch apparatus in a portable computer, comprising:
   a main body case including a key board and a front opening formed on said main body case;
   a cover case having a display unit, a latch opening formed on an outer plate of said cover case, a latch receptacle communicated with said latch opening, and a lever receptacle communicated with said latch receptacle, said cover case rotatably connected to said main body case and moving to an open position and a closed position;
   a lug rotatably attached to said latch receptacle, moving through said latch opening to a latch state while said cover is in said closed position and to an unlatch state while said cover is in said open position;
   a rack disposed within said latch receptacle, having a rack gear contacting a pinion formed on said lug, rotating said lug to position within said latch receptacle in said latch state and to project through said latch opening in said unlatched sate;
   a lever disposed within said lever receptacle and connected to said rack, allowing said lug to move between said latch state and said unlatch state, locking said lug to maintain in either one of said latch state and said unlatch state; and
   a lever protrusion formed on said lever engaging a convex portion formed on said lever receptacle in order to hold said lug in either one of said latch state and said unlatch state.

2. The apparatus of claim 1, said lever protrusion disengaging said convex portion, said lever and said rack moving to lock said lug in said unlatch state so as to position said lug within said lever receptacle in said open position without projecting said lug through said latch opening.

3. The apparatus of claim 1, said lever protrusion engaging said convex portion, said lever and said rack moving to lock said lug to maintain in said latch state so as to project said lug through said latch opening in said closed position.

4. The apparatus of claim 1, said lever and said rack moving linearly while said lug rotates by said rack.

5. The apparatus of claim 1, further comprised of an element disposed within said latch receptacle, biasing said rack to hold said lug in said unlatch state so as to position said lug within said receptacle without projecting through said latch opening.

6. The apparatus of claim 1, further comprised of a spring disposed within said receptacle, biasing said rack to hold said lug in said latch state while said lug projects through said latch opening in said closed position.

7. The apparatus of claim 6, further comprised of one end of said spring connected a side wall of said latch receptacle while the other end of said spring is connected to said rack.

8. The apparatus of claim 1, further comprised of a locker located within said latch receptacle, connected to said rack, allowing said rack unit to lock said lug to maintain in either one of said latch state and said unlatch state.

9. The apparatus of claim 8, said locker allowing said rack to lock said lug to position within said receptacle without projecting through said opening.

10. The apparatus of claim 9, said lug positioning within said latch receptacle without projecting through said opening while said locker is disconnected from said rack.

11. The apparatus of claim 8, further comprised of said locker initiating said cover to move from said closed position to said opening position while said rack moves said lug to said unlatch state.

12. The apparatus of claim 8, further comprised of a spring disposed within said receptacle and between said locker and one said of said latch receptacle, allowing said locker to initiate said cover to move from said main bode case.

13. A latch apparatus in a portable computer, comprising:
    a main body;
    a cover rotatably attached to said main body, moving in an open position and a closed position;
    a latch opening formed on said cover;
    a latch receptacle formed on said cover, communicated with said latch opening;
    a lug rotatably attached to said latch receptacle, moving to a latch state projecting one end of said lug through said latch opening while said cover and said main body are in said closed position and to an unlatch state positioning said lug within said latch receptacle without projecting said one end of said lug through said latch opening while said cover and said main body are in said open position, having a gear portion formed on the other end of said lug; and
    a rack disposed within said latch receptacle, having a rack gear connected to said gear portion of said lug, moving said lug between said latch state and said unlatch state.

14. The latch apparatus of claim 13, further comprised of:
    a lever receptacle formed on said cover, communicated with said latch receptacle, having a surface perpendicular to said latch opening; and
    a lever disposed within said lever receptacle and coupled to said rack, moving said rack to rotate said lug in either one of said latch state and said unlatch state.

15. The latch apparatus of claim 14, further comprised of:
    a first locking member formed on said lever;
    a second locking member formed on a side of said lever receptacle; and
    said rack locked to maintain said lug in either one of said latch state and said unlatch sate when said first locking member engages said second locking member.

16. The latch apparatus of claim 14, further comprised of:
    a middle plate formed between said latch receptacle and said lever receptacle;
    a hole formed on said middle plate; and
    said lever coupled to said rack through said hole.

17. The latch apparatus of claim 14, further comprised of an elastic member disposed between said rack and a side of said latch receptacle, biasing said rack to maintain said lug in either one of said unlatch state and said latch state.

18. The latch apparatus of claim 17, further comprised of:
    a rack holder formed on said rack; and
    a locker having a lock holder coupled to said rack holder of said rack to maintain said lug in said unlatched state preventing said lug from protruding from said latch opening.

19. The latch apparatus of claim 18, further comprised of:
    said locker having a portion disposed to protrude from a surface of said cover when said locker holder is uncoupled from said rack holder; and
    a spring biasing said locker to move said portion of said locker to push against said main body so as to initiate said cover to move from said closed position to said open position.

20. A method in a computer having a main body and a cover rotatable coupled to said main body and moving in an open position and a closed position, comprising of the steps of:

providing a latch opening, a latch receptacle, and a lever receptacle, said latch receptacle communicated with said latch opening and said lever receptacle;

providing a lug rotatable mounted in said latch receptacle, said lug having a hook formed on one end of said lug and a gear portion formed on the other end of said lug;

providing a rack disposed within said latch receptacle, said rack having a rack gear coupled to said gear portion of said lug;

providing a lever disposed within said lever receptacle to be coupled to said rack, said lever having a first locking member coupled to a second locking member formed on a side of said lever receptacle;

moving said lever;

allowing said rack connected said lever to rotate said lug between a latch state to latch said main body and said cover in said closed position and an unlatch state to unlatch said main body and said cover in said open position;

locking said lug in said latch state to latch said cover and said main body by coupling said first locking member to said second locking member while said lug projects from said latch opening of said cover; and locking said lug in said unlatch state to unlatch said cover and said main body by uncoupling said first locking member from said second locking member while said lug positions within said cover without projecting through said latch opening.

* * * * *